J. E. DUNGAN.
SHIPPING AND FILLING RECEPTACLE.
APPLICATION FILED MAR. 17, 1920.
1,411,271.
Patented Apr. 4, 1922.
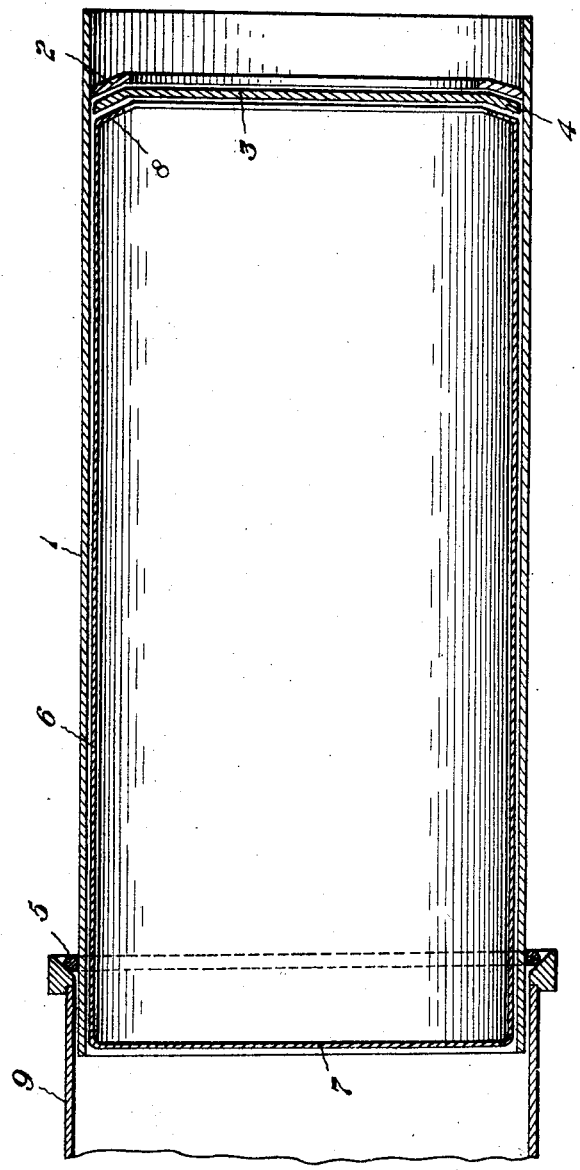
INVENTOR.
John E. Dungan.
BY
ATTORNEYS.

UNITED STATES PATENT OFFICE.

JOHN E. DUNGAN, OF CANTON, OHIO, ASSIGNOR, BY DIRECT AND MESNE ASSIGNMENTS, OF SEVEN-SIXTEENTHS TO WALTER S. BRYSON, ONE-SIXTEENTH TO BENJAMIN F. BONE, ONE-SIXTEENTH TO FRANK M. HOWARD, ONE-SIXTEENTH TO JAMES A. SCHAUB, ONE-SIXTEENTH TO ALLEN C. SCROGGINS, JR., ONE-SIXTEENTH TO H. J. ZINK, AND ONE-SIXTEENTH TO EDWARD E. KOONTZ, ALL OF MOUNDSVILLE, WEST VIRGINIA.

SHIPPING AND FILLING RECEPTACLE.

1,411,271.     Specification of Letters Patent.     Patented Apr. 4, 1922.

Original application filed November 15, 1919, Serial No. 338,160. Divided and this application filed March 17, 1920. Serial No. 366,563.

*To all whom it may concern:*

Be it known that I, JOHN E. DUNGAN, a citizen of the United States, residing at Canton, in the county of Stark and State of Ohio, have invented a new and useful Shipping and Filling Receptacle, of which the following is a specification.

This invention relates to shipping and filling receptacles for storing and shipping semi-solid substances, and is a division of my application, Serial No. 338,160 filed November 15, 1919 upon machine for dispensing semi-solid substances.

The objects of the invention are to provide a shipping and filling container so constructed that the ice cream or other semi-solid substance may be easily placed therein or removed therefrom in a collapsible container. The receptacle being designed to easily and readily fill the container of the dispensing apparatus as the contents of the receptacle are removed therefrom.

With these objects in view the invention consists in the novel construction and arrangement of parts, hereinafter described, illustrated in the accompanying drawings, and particularly pointed out in the appended claims, it being understood that various changes in the form, proportions, size and minor details of construction may be made within the scope of the appended claims, without departing from the spirit or sacrificing any of the advantages of the invention.

The invention thus set forth in general terms is illustrated in the accompanying drawings forming part hereof, in which—

The figure is a longitudinal sectional view of the filling and shipping receptacle showing the collapsible container filled with ice cream therein, the receptacle being shown in position for filling the container or cylinder of the dispensing machine illustrated in the co-pending application referred to.

The receptacle in which the ice cream is shipped and from which it is removed to be placed within the cylinder of the dispensing apparatus is preferably in the form of an open ended cylinder provided near its lower end with an inwardly disposed downwardly inclined annular flange 2, a removable disk 3, provided around its periphery with an angularly disposed annular flange 4, forming the bottom of the receptacle.

An annular flange 5 is provided around the exterior of the receptacle at a point spaced a short distance from the upper end thereof. The ice cream is shipped in these receptacles or carriers and kept therein until placed within the cylinder of the dispensing apparatus illustrated in my co-pending application above mentioned.

The ice cream is contained within a collapsible container 6 which is of proper dimensions to be placed within the receptacle 1', the upper end of said collapsible container being closed as shown at 7 while the lower end is provided with an in-turned flange 8.

In filling the cylinder 9 of the dispensing apparatus the upper open end of the receptacle 1 is placed within the mouth of the cylinder, the annular flange 5 limiting the distance which the receptacle 1 is inserted within the cylinder.

By placing the hand within the other end of the receptacle and against the disk 3 the ice cream within the collapsible container 6 may be slid into the cylinder after which the receptacle 1 and disk 3 are removed from the dispensing apparatus.

Although the drawings and above specification disclose the best mode in which I have contemplated embodying my invention I desire not to be limited to the details of such disclosure, for, in the further practical application of my invention, many changes in form and construction may be made, as circumstances require or experience suggests, without departing from the spirit of the invention, within the scope of the appended claims.

I claim:

1. A shipping and filling receptacle for a dispensing machine comprising an open ended tube arranged to contain an inverted, collapsible container, the lower end of which is open, the upper end of the tube being arranged to be inserted into the mouth of the dispensing machine, an annular bead upon the exterior of the tube near the upper end thereof for limiting its insertion into the mouth of the dispensing machine, an annular internal flange spaced from the lower end of the tube and a removable plate arranged to rest upon said flange to support the lower open end of the collapsible container.

2. A shipping and filling receptacle for a dispensing machine comprising an open ended tube, one end of which is arranged to be inserted into the mouth of the dispensing machine, an external, annular bead upon the tube to limit its insertion into the mouth of the dispensing machine, an internal, annular, downwardly inclined flange spaced from the other end of the tube and a removable plate provided with an annular, inclined flange arranged to rest thereon.

In testimony that I claim the above, I have hereunto subscribed my name.

JOHN E. DUNGAN.